No. 843,961. PATENTED FEB. 12, 1907.
W. W. McCARTY.
LAWN MOWER.
APPLICATION FILED JULY 31, 1906.
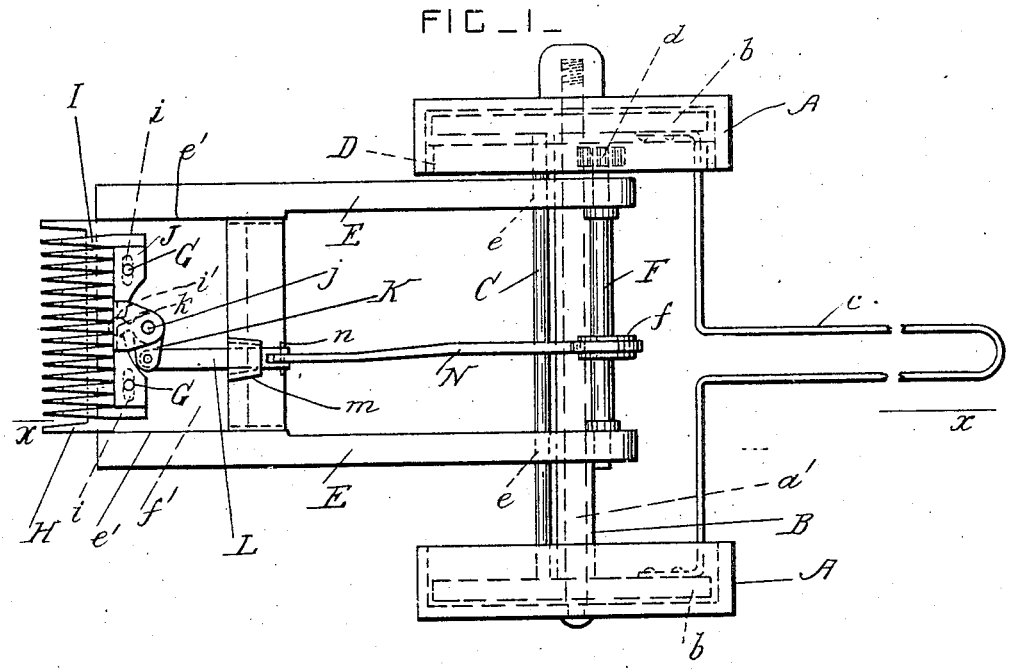
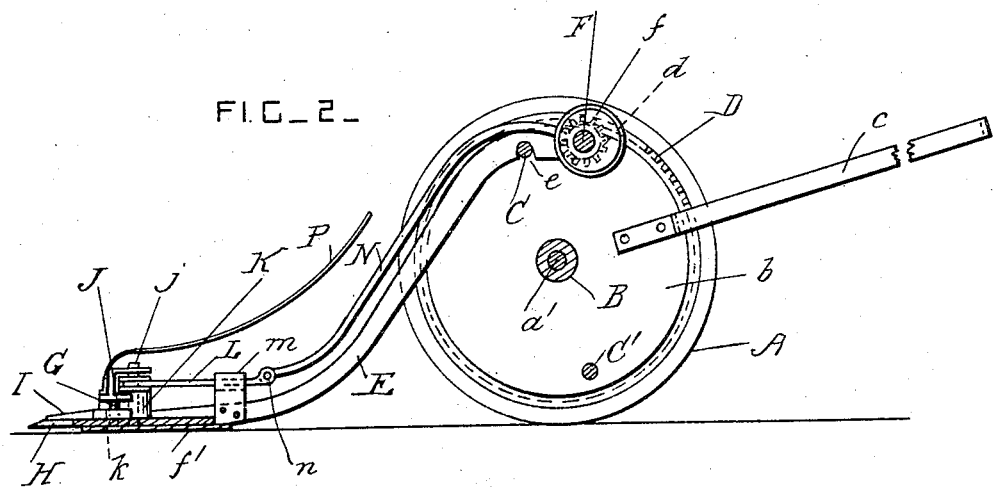
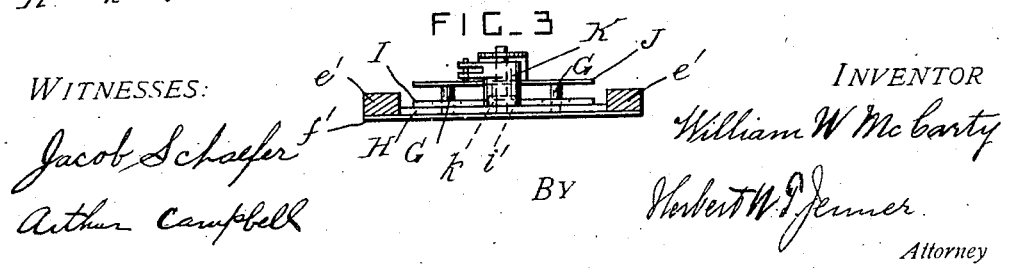
WITNESSES:
Jacob Schaefer
Arthur Campbell
INVENTOR
William W McCarty
BY Herbert W Jenner
Attorney

UNITED STATES PATENT OFFICE.

WILLIAM WILEY McCARTY, OF DIAMOND, INDIANA.

LAWN-MOWER.

No. 843,961.  Specification of Letters Patent.  Patented Feb. 12, 1907.

Application filed July 31, 1906. Serial No. 328,590.

*To all whom it may concern:*

Be it known that I, WILLIAM WILEY MC-CARTY, a citizen of the United States, residing at Diamond, in the county of Parke and State of Indiana, have invented certain new and useful Improvements in Lawn-Mowers; and I do hereby declare the following to be a full, clear, and exact description of the invention, such as will enable others skilled in the art to which it appertains to make and use the same.

This invention relates to mowing-machines; and it consists in the novel construction and combination of the parts or attachments hereinafter fully described and claimed, whereby the machine is specially adapted for cutting grass under fences and in other similar confined places.

In the drawings, Figure 1 is a plan view of the mower with the guard-plate removed. Fig. 2 is a longitudinal section through the mower, taken on the line $x$ $x$ in Fig. 1. Fig. 3 is a rear view of the cutting mechanism.

A are the ground-wheels of a hand lawn-mower of any approved construction. These wheels are mounted on an axle $a'$, and B is a tubular shaft also mounted on the said axle and having frame-plates or disks $b$ secured to its ends. C is a cross-bar between the said frame-plates, and $c$ is a handle also secured to the said plates for pushing or pulling the machine along. C' is a second cross-bar similar to the cross-bar C; but this cross-bar C' may be omitted, if desired. One of the ground-wheels is provided with internal teeth D. All the above-mentioned parts are of any approved construction, and the lawn-mower may also have cutting mechanism of any approved construction (not shown in the drawings) for use in mowing lawns in the usual way.

In order to enable the machine to cut grass under fences and in other confined places which cannot be reached by the ordinary cutting mechanism, an auxiliary frame and specially-contrived cutting mechanism is provided.

E are two arms which form the side plates of the auxiliary frame. These arms are provided near their upper ends with notches $e$, which are slipped into engagement with the cross-bar C.

F is a shaft which is journaled in the upper ends of the arms E, and $f$ is an eccentric secured on the middle portion of the said shaft. A toothed pinion $d$ is secured on the projecting end portion of the said shaft, and it engages with the teeth D. The lower end portions of the said arms have a ground-plate $f'$ secured to them, and the lower end portions $e'$ of the said arms close above the ground-plate form two parallel bars.

G are two guide-pillars secured to the middle portions of the ground-plate and projecting upwardly from it. H is a serrated cutting-blade arranged upon the said pillars and between the said bars. This cutting-blade rests upon the ground-plate, but is not rigidly secured to it, so that it is free to slide upwardly upon the guide-pillars to a limited extent. I is the upper serrated cutting-blade, which is provided with slots $i$, engaging with the said guide-pillars, so as to be slidable crosswise of the auxiliary frame. A socket $i'$ is formed in the rear part of the blade I. As will be seen in Fig. 3, both blades H and I are free to slide upwardly to a limited extent. The bars $e'$ form guides for the lower blade H, and the ground-plate normally supports it, so that the said lower blade is carried by the auxiliary frame without being rigidly secured to it. The blade H cannot slide endwise because of the said bars $e'$; but the upper blade I is free to slide endwise and is reciprocated over the lower blade. By supporting the blades in this manner without rigidly securing the lower blade to the auxiliary frame the machine or attachment is better adapted to cut weeds and grass in rough places and under fences which cannot be reached by the ordinary mowing-machine. J is a bracket or plate secured to the tops of the said guide-pillars and provided with a pin $j$.

K is a bell-crank lever pivoted on the pin $j$ and provided with a projecting arm $k$, which engages with the socket $i'$ of the upper cutting-blade. L is a connecting-rod which is pivoted to the other arm of the said bell-crank lever and which is slidable in a guide $m$, secured crosswise between the two arms of the auxiliary frame.

N is an eccentric-rod pivoted to the connecting-rod by a pin $n$ and provided with an eccentric-strap which engages with the eccentric $f$.

P is a guard-plate arranged over the working parts and secured to the bracket J or any other convenient part, so as to prevent grass from falling into the working parts.

When the machine is pushed back and forth by means of the handle, the shaft F is revolved and the motion is communicated to the bell-crank lever by means of the eccentric and eccentric-rod, so that the upper cutting-blade is reciprocated over the lower cutting-blade. The grass and weeds are cut between the serrations of the blades, and the cutting-blades can be pushed under fences and into other places which cannot be reached otherwise.

Both cutting-blades H and I are free to slide vertically upon the guides G to a limited extent in the space between the plates $f'$ and J, and the upper blade I has more freedom to move vertically than the lower blade, which is not reciprocated laterally. This vertical motion of the two blades enables them to cut freely in rough places. The frictional contact of the frame E with the cross-bar C is ordinarily sufficient to prevent the said frame from sliding on the said bar; but any other approved means can be used to prevent the frame from sliding, if desired.

What I claim is—

1. The combination, with the main frame of a mower having a cross-bar, and a toothed driving-wheel; of an auxiliary frame provided with arms having notches near their upper ends for engaging with the said cross-bar, cutting-blades carried by the lower parts of the said arms, a shaft journaled at the upper parts of the said arms, a toothed pinion secured on the said shaft and engaging with the teeth of the said driving-wheel, and driving mechanism for reciprocating one of the said blades from the said shaft.

2. The combination, with a mowing-machine provided with an axle, a driving-wheel mounted on the said axle, and a main frame pivoted on the said axle and provided with a cross-bar above the said axle; of a detachable auxiliary frame engaging with the said cross-bar, a driving-shaft journaled in the said auxiliary frame and provided with means for operatively connecting it with the said driving-wheel, cutting-blades carried by the said auxiliary frame, and intermediate driving mechanism for reciprocating one of the said blades from the said shaft.

3. The combination, with a frame provided with a ground-plate, guides projecting upwardly from the said ground-plate, and an upper plate secured to the said guides; of two cutting-blades slidable vertically on the said guides between the two said plates, and means for reciprocating one of the said cutting-blades crosswise of the other cutting-blade.

4. The combination, with a frame provided with a ground-plate, guides projecting upwardly from the said ground-plate, and an upper plate secured to the said guides; of two cutting-blades slidable vertically on the said guides, a bell-crank lever pivoted to the said upper plate and engaging with one of the said cutting-blades, and means for oscillating the said bell-crank lever and thereby reciprocating one blade crosswise of the other.

In testimony whereof I have affixed my signature in the presence of two witnesses.

WILLIAM WILEY McCARTY.

Witnesses:
 CHAS. C. DOIDGE,
 NEWTON THOMAS.